United States Patent [19]

Maeda

[11] Patent Number: 5,343,243
[45] Date of Patent: Aug. 30, 1994

[54] DIGITAL VIDEO CAMERA

[75] Inventor: Eiichi Maeda, Kawasaki, Japan

[73] Assignee: Ricoh Company, Ltd., Tokyo, Japan

[21] Appl. No.: 997,448

[22] Filed: Dec. 28, 1992

[30] Foreign Application Priority Data

Jan. 7, 1992 [JP] Japan .................................. 4-000934
Jan. 8, 1992 [JP] Japan .................................. 4-001586
Nov. 26, 1992 [JP] Japan .................................. 4-317280

[51] Int. Cl.$^5$ .................................... H04N 9/04
[52] U.S. Cl. ..................................... 348/222; 348/231
[58] Field of Search ............... 358/41, 43, 44, 27, 358/290, 909, 906, 213.25, 162, 228, 160, 140; 348/207, 220, 221, 222, 230, 231, 234, 237, 345, 362, 363, 252, 241; H04N 9/07, 9/077, 9/04

[56] References Cited

U.S. PATENT DOCUMENTS 4,758,883 7/1988 Kawahara et al. .................. 358/41
5,016,107 5/1991 Sasson et al. ...................... 358/906
5,077,602 12/1991 Moberg .............................. 358/27
5,194,944 3/1993 Uchiyama et al. ................. 358/41

FOREIGN PATENT DOCUMENTS 0469836 2/1992 European Pat. Off. ......... H04N 9/4
0149286 1/1985 Japan .................................. 358/43
2-122787 5/1990 Japan .

Primary Examiner—James J. Groody
Assistant Examiner—Michael H. Lee
Attorney, Agent, or Firm—Oblon, Spivak, McClelland, Maier & Neustadt

[57] ABSTRACT

A digital video camera including an image sensor, comprises a line memory, unit for storing a plurality of digitized raster scanning data transferred from the image sensor, and a processing unit for reading out a plurality of data in the form of block or matrix from the line memory means and converting the data into luminance data and color-difference data every block or matrix.

14 Claims, 17 Drawing Sheets

D : DELAY CIRCUIT
(PER PICTURE ELEMENT)

Fig. 12
(a)
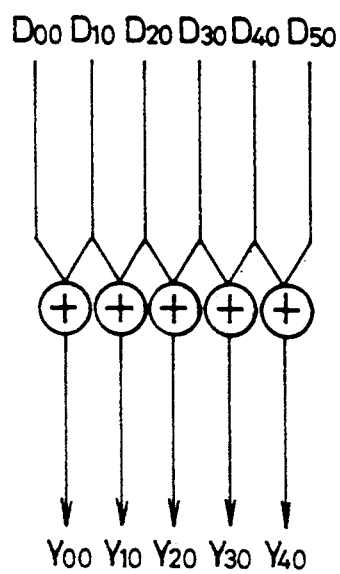
(b)
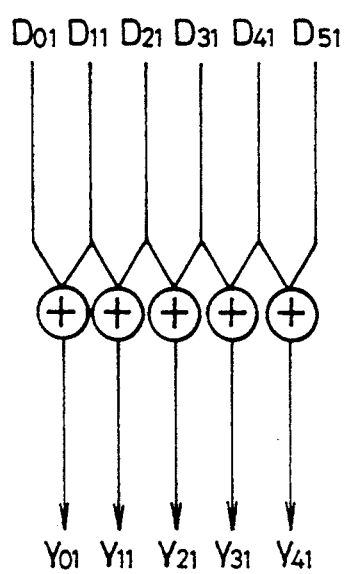
(c)
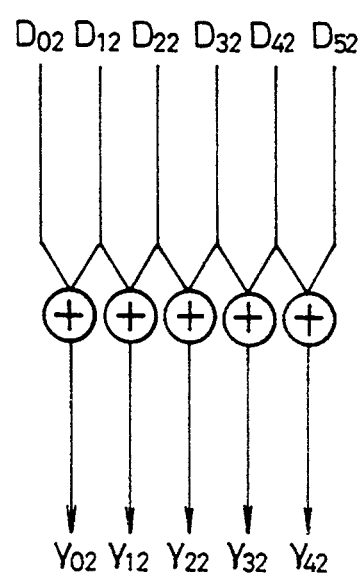
(d)
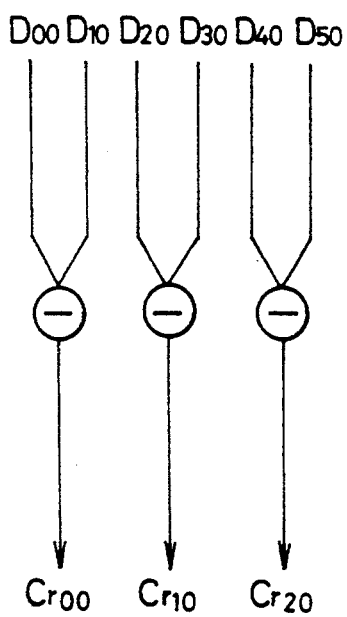
(e)
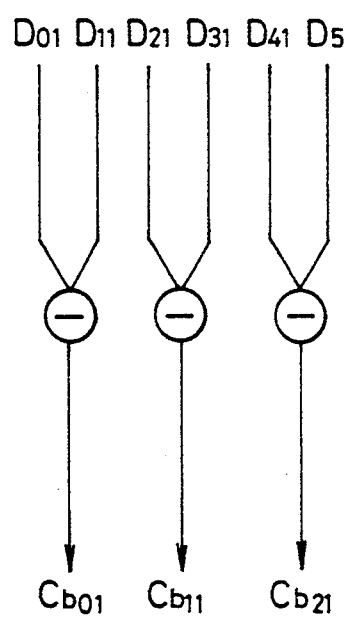
(f)
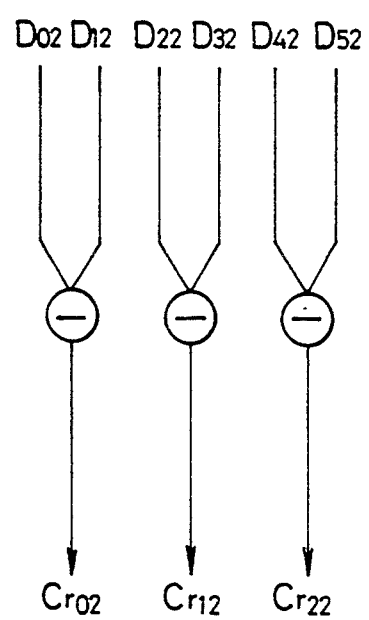

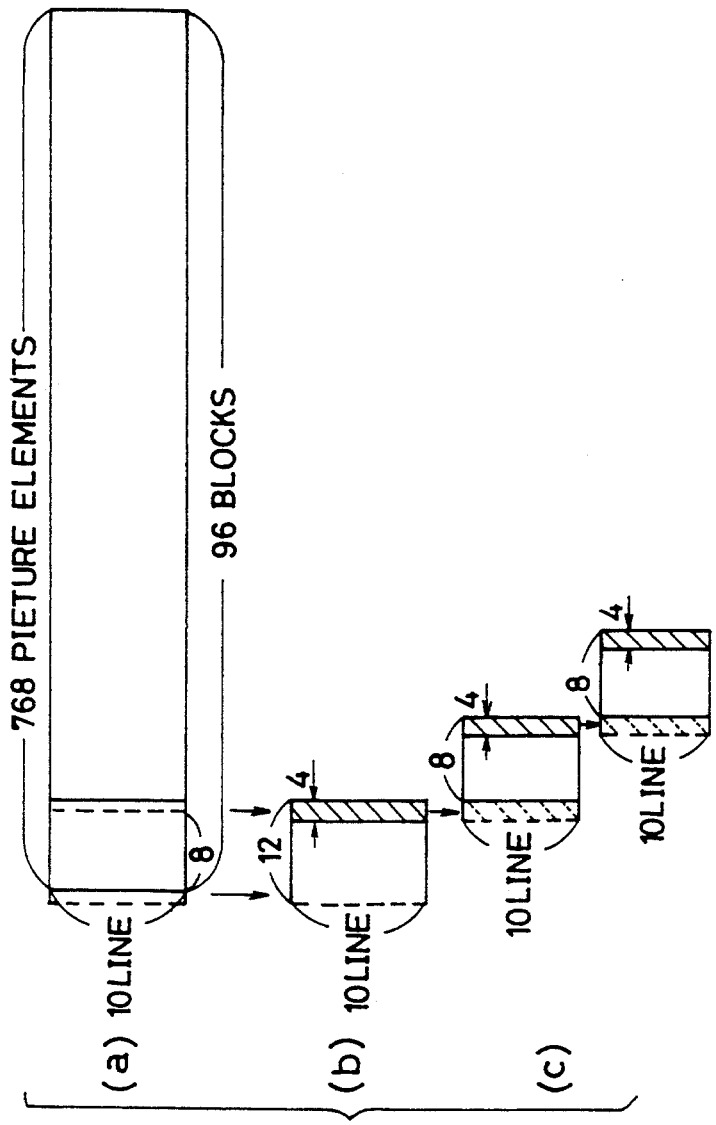
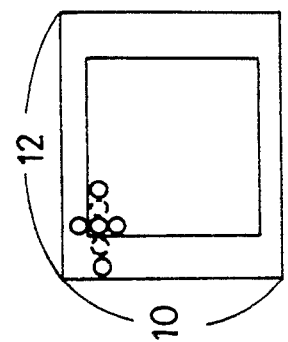
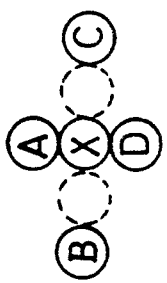
Fig. 13
Fig. 14a
Fig. 14b

DIGITAL VIDEO CAMERA

BACKGROUND OF THE INVENTION

1. Field of the Invention

The present invention relates to a digital video camera, and more particularly to a camera process circuit disposed in the digital video camera for converting output data from an image sensor into luminance data and color-difference data every data block including a plurality of data for data compression of image data using a line memory.

2. Description of the Related Art

In a standard system of color image compression, for example Joint Photographic-coding Expert Group (JPEG) or Motion Picture Image-coding Group system, output signals by a charge-coupled device (CCD) must be processed every 8×8 data block without the processing of raster scans when image compression is made using a standard data compression method, for example Adaptive Discrete Cosine Transform (ADCT). Conventionally, there are provided with a frame memory, and output signals from the CCD are converted into image data involving luminance data and color-difference data. These image data are stored temporally in the frame memory. Then, the image data by raster scans are read out every data block for data compression under address controls and converted every data block.

In such a conventional digital video camera which compresses the stored image data, the frame memory is an indispensable element for reading and converting the image data every data block. This increases a cost of the digital video camera.

In a case of processing motion pictures for data compression, a frame memory capacity of which is 5.9 Mbit (=768 pictures×480 lines×8 luminance signals×8 color-difference signals) is necessary for storing luminance signals and color-difference signals converted from output signals of the CCD.

SUMMARY OF THE INVENTION

It is therefore an object of the present invention to provide a digital video camera converting raster scanning signals from a CCD into luminance signals and color-difference signals using at least one line memory.

The object of the invention, as will appear from the reading of the following specification, are achieved by a digital video camera including an image sensor, comprising a line memory unit for storing a plurality of digitized raster scanning data transferred from the image sensor, and a processing unit for reading out a plurality of data in the form of block or matrix from the line memory means and converting the data into luminance data and color-difference data every block or matrix.

In operation, the plurality of digitized raster scanning data are stored in the line memory unit. This storing process is performed every raster scanning. The stored data are read out every block or matrix from the line memory unit. That is, block data are transferred from the line memory unit to the processing unit in the form of matrix with N rows and M columns. The transferred data are converted into luminance data and color-difference data every block.

Therefore, since the conversion can be performed in real time, the digital video camera according to the invention can process output signals from the image sensor at a high speed. In addition, the digital video camera can compress the luminance data and color-difference data for motion pictures.

The line memory unit may comprise two line memories each storing a plurality of digitized raster scanning data and a switch circuit connected to the two line memories for connecting the two line memories with the processing means alternately. In this case, an address generating circuit can be simplified.

Preferably, the line memory unit comprises a single line memory. In this case, a cost of the camera is decreased because the switch is not necessary.

In a preferred embodiment, the digital video camera comprises a single line memory for storing a plurality of digitized raster scanning data transferred from the image sensor, a processing unit for reading out a plurality of data in the form of block or matrix from the line memory and converting the data into luminance data and color-difference data every block or matrix, a controlling unit for controlling a timing of a storing process of the plurality of digitized raster scanning data in the line memory and a reading out process of the plurality of data by the processing means, a compressing unit for compressing the luminance data and the color-difference data transferred from the processing means, a recording unit for recording the compressed luminance block data and the compressed color-difference block data, and a reproducing unit for reading out the recorded luminance block data and the color-difference block data from the recording means and reproducing video analog signals from these data.

In this case, a cost of the camera is decreased because the camera is provided with only one line memory. In addition, the reproducing circuit may comprise an aperture correction circuit for putting in aperture correction on the recorded luminance block data and the color-difference block data, thereby the recording unit can be simplified.

Further, the controlling unit may comprise an address controller controlling the reading out process from the line memory by the processing unit at twice a frequency of write clock signals in the storing process. In this case, an address generating circuit disposed in the address controller can be simplified and need not a clock signal with a high frequency because the ratio of the frequencies of the read clock signals and the write clock signals is a multiple of 2.

Further objects and advantages of the present invention will be apparent from the following description of the preferred embodiments of the invention as illustrated in the accompanying drawings.

BRIEF DESCRIPTION OF THE DRAWINGS

FIG. 12 shows a concrete example of the Y process circuit and the RGB process circuit in FIG. 11;

FIG. 13 shows a writing and reading operation in the line memory according to the first embodiment of the invention;

FIG. 14a, 14b show an example of the aperture correction;

DESCRIPTION OF THE PREFERRED EMBODIMENTS

Figure 1:
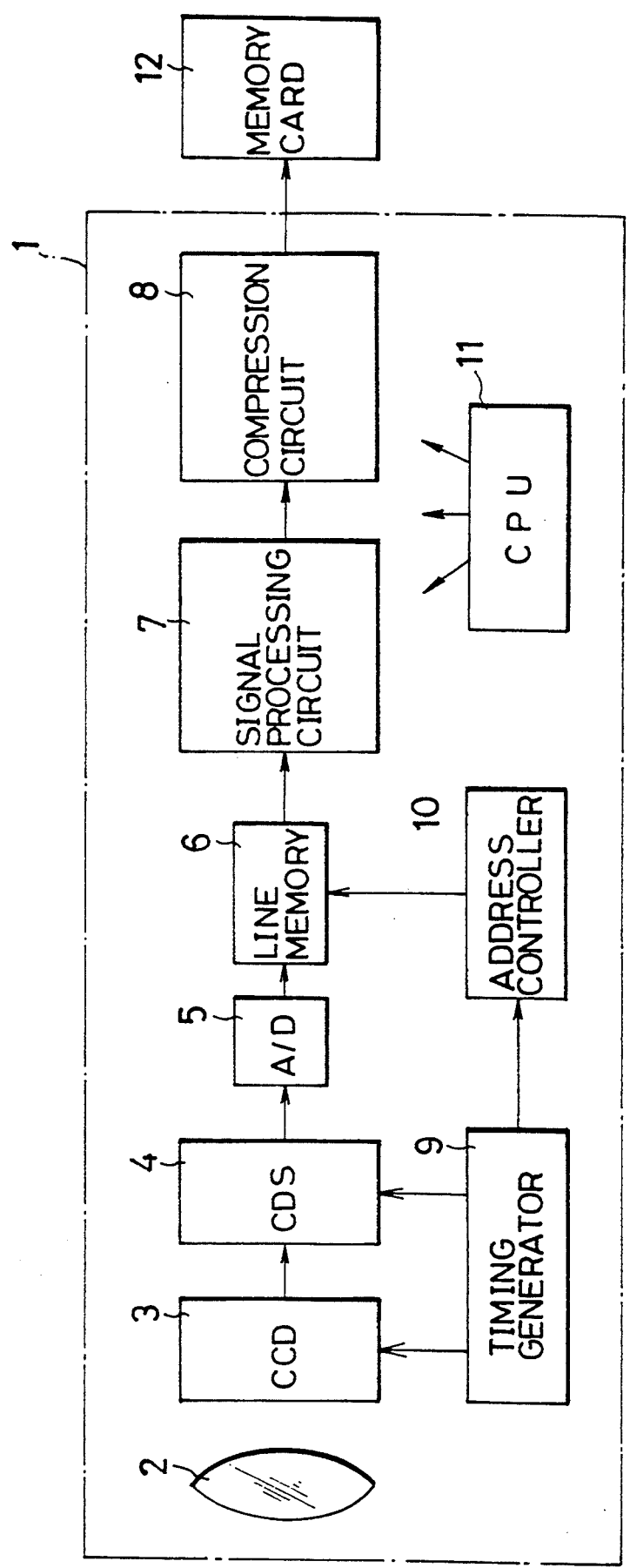
FIG. 1 shows a block diagram of a digital video camera according to the present invention.

FIG. 1 shows a block diagram of a digital video camera according to the present invention. In FIG. 1, reference numeral 1 denotes a digital video camera; 2, a lens; 3, a charge-coupled device (CCD); 4, a correlation double sampling circuit (CDS); 5, an analog to digital (A/D) convertor; 6, a line memory; 7, a signal processing circuit converting CDS data into luminance data and color-difference data; 8, a compressing circuit; 9, a timing generator; 10, an address controller controlling the line memory 6 in response to a timing signal from the timing generator 9; 11, a central processing unit (CPU) controlling each element of the digital video camera; and 12, a memory card.

Next, the description will be directed to an operation of the digital video camera of FIG. 1. In a recording mode, an incident light passing through the lens 2 is converted to electric signals by the CCD 3. The electric signals are output from the CCD 3 by raster scans and a reset noise component is eliminated from each electric signal from the CCD 3 by the CDS circuit 4. The raster signals are converted into digital signals by the A/D convertor 5, and the digital signals are stored in the line memory 6 and converted to a plurality of block signals each including (n×n) signals in the line memory 6 under the control of the address controller 10 in response to timing signals of the timing generator 9.

The (n×n) signals in one block are converted into (n×n) luminance signals (Y) and color-difference signals (R-Y and B-Y) in one block by the signal processing circuit 7. The luminance signals and color-difference signals are compressed by the compressing circuit and then the compressed image data are stored in the memory card 12. These sequentially processing are controlled by the CPU 11 and performed every block.

Figure 2:
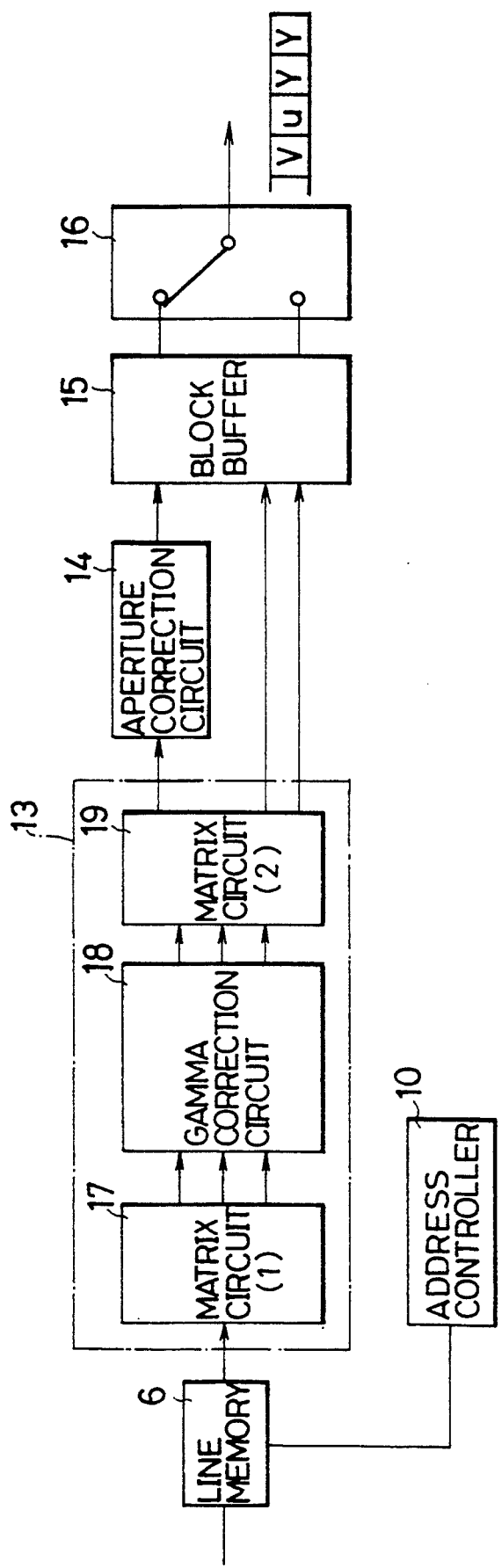
FIG. 2 shows a detailed block diagram of an example of the signal processing circuit shown in Fig. 1.

FIG. 2 shows a detailed block diagram of an example of the signal processing circuit 7 shown in FIG. 1. In FIG. 2, reference numeral 13 denotes a camera process circuit and the circuit 13 comprises a matrix circuit (1) 17, a gamma control circuit 18 and a matrix circuit (2) 19. Reference numeral 14 denotes an aperture correction circuit; 15, a block buffer; and 16, a changing switch for selecting an output of the block buffer 15.

Digital output signals in one block, which results from the conversion from raster signals in the line memory 6 capable of storing n line raster signals under the control of the address controller 10, are transferred to the camera process circuit 13, whereby the digital signals are converted into luminance signals and color-difference signals every block by the matrix circuit (1) 17 and these signals are corrected in accordance with gamma of a cathode-ray tube. Further, the corrected signals are converted into luminance signals (Y) and color-difference signals (R-Y and B-Y) by the matrix circuit (2) 19, and the luminance signals (y) are stored in the block buffer 15 after the correction with respect to frequency characteristics by the aperture correction circuit 14 and the color-difference signals (R-y and B-Y) are also stored in the buffer 15. The block buffer 15 can store one block data for the luminance signals (Y) and two block data for the color-difference signals (R-Y and B-Y). The changing switch 16 interleaves transfers of the luminance signals (Y) and the color-difference signals (R-Y and B-Y) from the buffer 15 to the compression circuit, whereby the Y block of the luminance signals (Y), the R-Y block of the color-difference signals (R-Y) and the B-Y block of the color-difference signals (B-Y) are transferred serially to the compression circuit.

Figure 3:
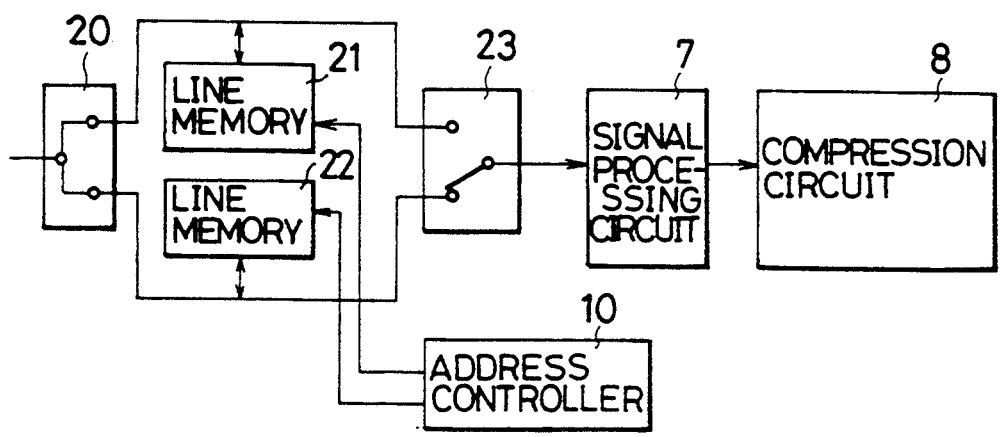
FIG. 3 shows a block diagram of a main part of a digital video camera according to a first embodiment of the invention.
Figure 4:
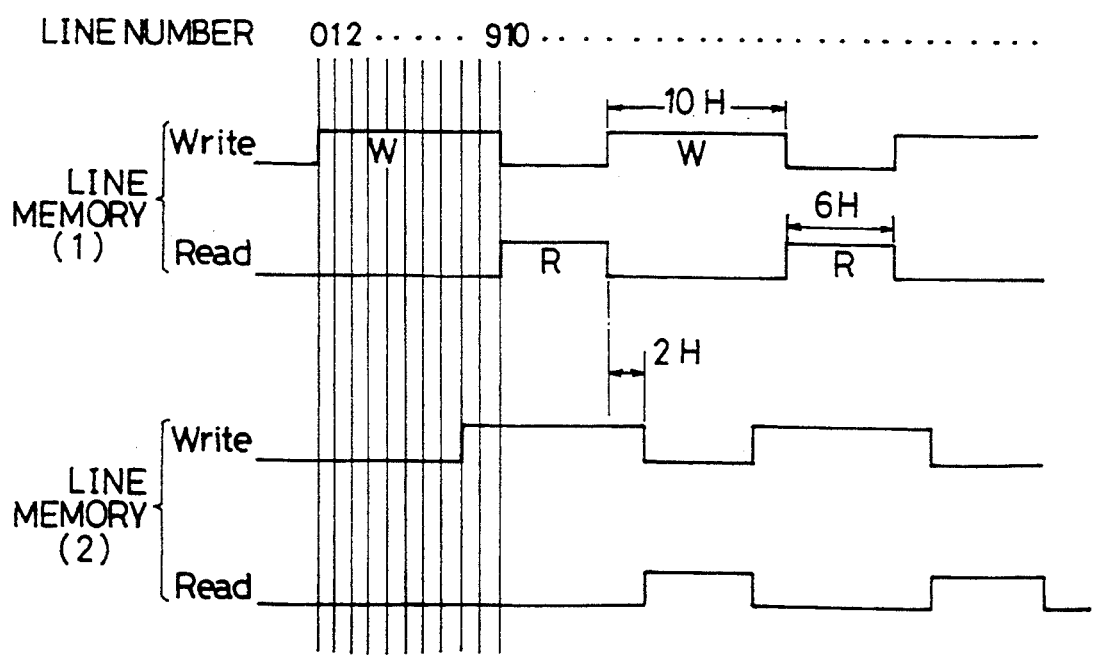
FIG. 4 shows a timing chart of the writing and reading process mode of the line memory of the video camera according to the first embodiment.

FIG. 3 shows a block diagram of a main part of a digital video camera according to a first embodiment of the invention, and FIG. 4 shows a timing chart of the writing and reading process mode of the line memory of the video camera according to the first embodiment. In FIG. 3, reference numeral 20 denotes a bus receiver; 21, a line memory (1); 22, a line memory (2); and 23, a changing switch. Output signals by the A/D convertor (see FIG. 1) are routed by the bus receiver 20 and written in the line memory (1) 21 at first. After a first set of eight line output signals starting from the line number 0 are written every line in the line memory (1) 21 during the high state of a write pulse with 10 horizontal duration (10HD). The next two line output signals are written in both the line memory (1) 21 and the single port line memory (2) 22 simultaneously. Then the bus receiver changes the route of the next set of eight line output signals starting from the line number 11, whereby the line output signals starting are written in the single port line memory (2) 22.

Line data written in the line memory (1) 21 are read out at twice the frequency of the write clock signals.

The changing switch connects one of the line memories (1) and (2) with the signal processing circuit 7 in accordance with read mode signals shown in FIG. 4 and data read out from the line memories (1) and (2) are transferred to the processing circuit 7 and further to the compression circuit 8. In the compression circuit 8, the data are compressed. The timing of the write and read mode signals are controlled by the address controller. In the reading operation, each of ten line data are read out serially at twice the frequency of the write clock signals during the high state of the read pulse with 6 horizontal duration (6HD). Each set of ten line data is read out every block alternately from the line memory (1) and the line memory (2).

Figure 5:
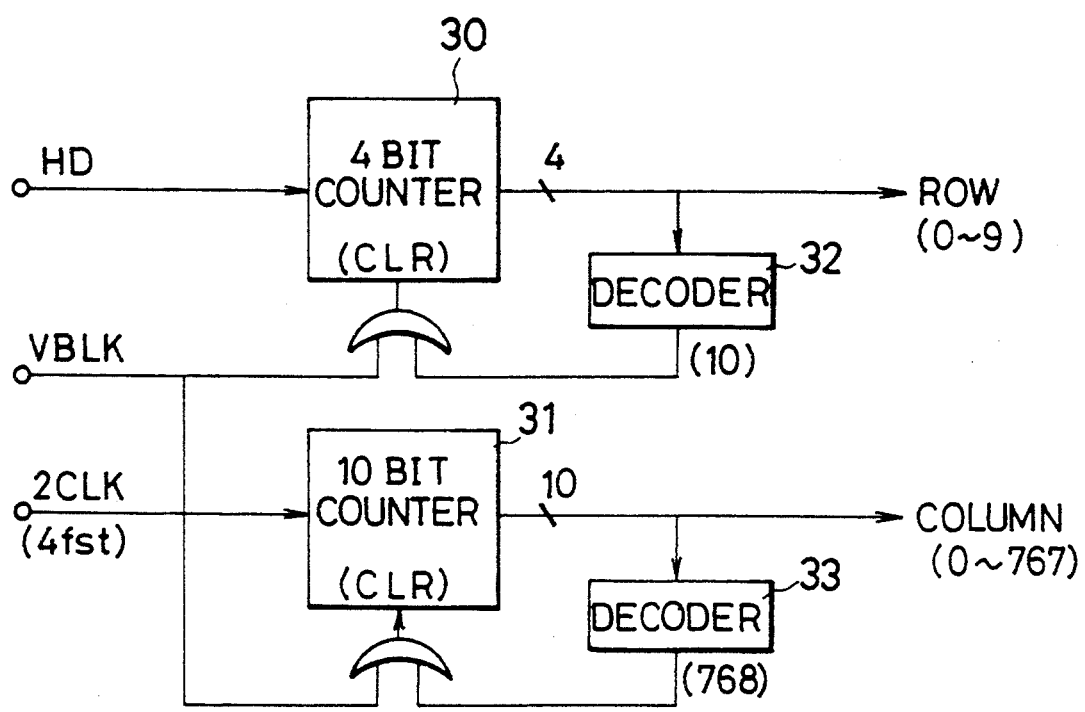
FIG. 5 shows a concrete example of a writing unit of the address controller according to the first embodiment.

FIG. 5 shows a concrete example of a writing unit of the address controller according to the first embodiment. The line memory is provided with a plurality of storage elements in the form of array with 10 rows and 768 columns. In the writing operation, since digitized raster signals are written in the line memory, the writing unit of the address controller counts a horizontal synchronizing signal (HD) in a 4 bit counter 30 and outputs a 4 bit row address representing the decimal number (0-9). When the row address is equal to the decimal number 10, a decoder 32 outputs a pulse for resetting the 4 bit counter 30. The 4 bit counter is also reset by a vertical blanking signal (VBLK). A 10 bit counter receives and counts a clock signal (2CLK) the frequency of which is a second submultiple of the frequency of master clock signals for the CCD and outputs a 10 bit column address. When the column address is equal to the decimal number 768, a decoder 33 decodes the address and generates a reset pulse for resetting the counter 31.

Figure 6:
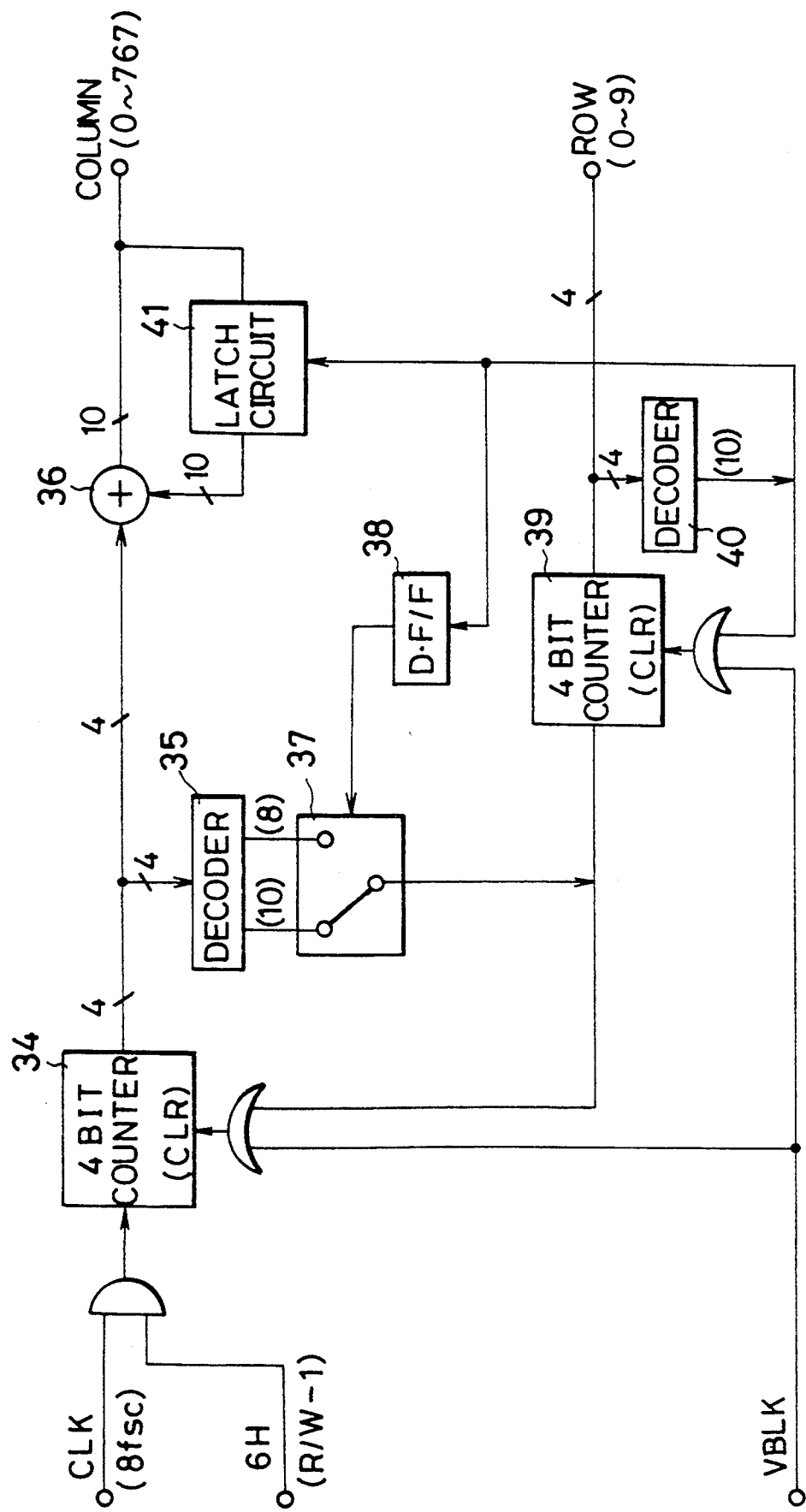
FIG. 6 shows a concrete example of a reading unit of the address controller according to the first embodiment.

FIG. 6 shows a concrete example of a reading unit of the address controller according to the first embodiment. Data are read out every block during 6 horizontal duration (6HD) in response to master clock signals CLK for the CCD. A logical AND operation is implemented on clock signals (CLK) and a 6H pulse for defining a reading period and the output of the operation is applied to a 4 bit counter 34, whereby the clock signals are counted. When reading block data every block from 10 horizontal (10H) line data in the line memory, the first block data with 10 vertical rows and 10 horizontal columns are read out at first. All remaining block data are read out every 8 column after the first block. When the 4 bit counter 34 outputs the 4 bit binary data representing the decimal number 10 after the reading of the first block, a decoder 35 decodes the 4 bit binary data and outputs a reset pulse resetting the counter 34. When the 4 bit counter 34 outputs the 4 bit binary data representing the decimal number 8 after the reading of the second block, the decoder 35 also decodes the 4 bit binary data representing the decimal number 8 and outputs a reset pulse to the counter 34. The output 4 bit data from the counter 34 is added cumulatively with an output data from a latch circuit 41 by an adder 38 and the result data is output as a 10 bit column address. The latch circuit 41 receives the column address signal at an input thereof and latches the address when a latch pulse is applied thereto.

A row address must be defined similarly for each block. A pulse, which is decoded from a 4 bit binary data used for a column address by the decoder 35, is input to a 4 bit counter 39 as a clock signal, whereby the pulse is counted and a 4 bit row address is output from the counter 39. A decoder 40 have an input connected the 4 bit counter 39 and outputs a reset pulse to the counter 39 when the counter 39 outputs the row address equal to the decimal number 10, whereby the counter 39 is reset. The reset pulse is also input to the latch circuit 41. A D flip-flop 38 latches the reset pulse from the decoder 40 and outputs a control signal for controlling the switch 37 selecting outputs of the decoder 35 such that the decoded pulse for the decimal number 10 is selected for the first block and the decoded pulse for the decimal number 8 is selected for the other blocks. Therefore, the line memory can be accessed every block by the address controller.

Figure 7:
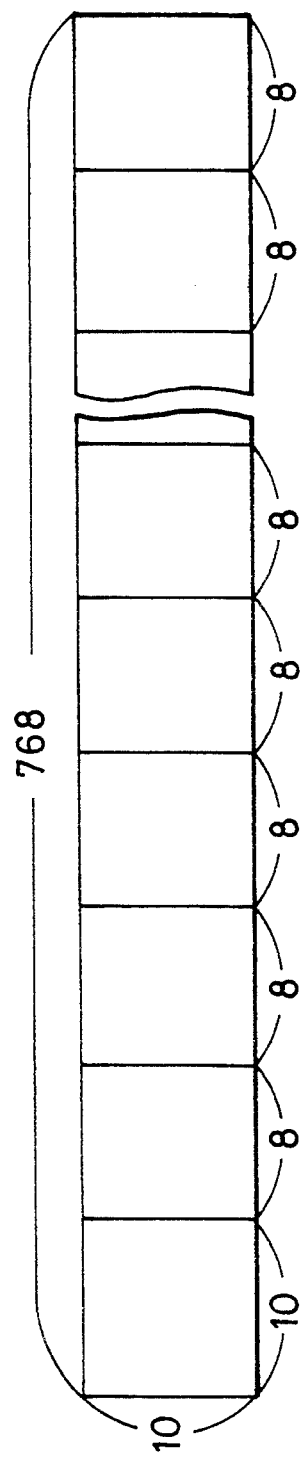
FIG. 7 shows raster scanning line data involving a plurality of block data stored in the line memory.

FIG. 7 shows raster scanning line data involving a plurality of block data stored in the line memory. CDS data resulting from the CDS circuit are written every raster scan in the line memory. A set of ten line data is stored in the storage array with 10 rows and 768 columns as shown in FIG. 7. The reading operation is performed in such a manner that the first block data having (10×10) data are read out at first and in turn the other blocks each having (10×8) data are read serially as shown in FIG. 7, because a part of block data used at the prior stage is also necessary for the next processing and therefore the part of block data can be accessed using an internal register for storing the part of block data. The internal register is disposed in the camera signal processing circuit.

Figure 8:
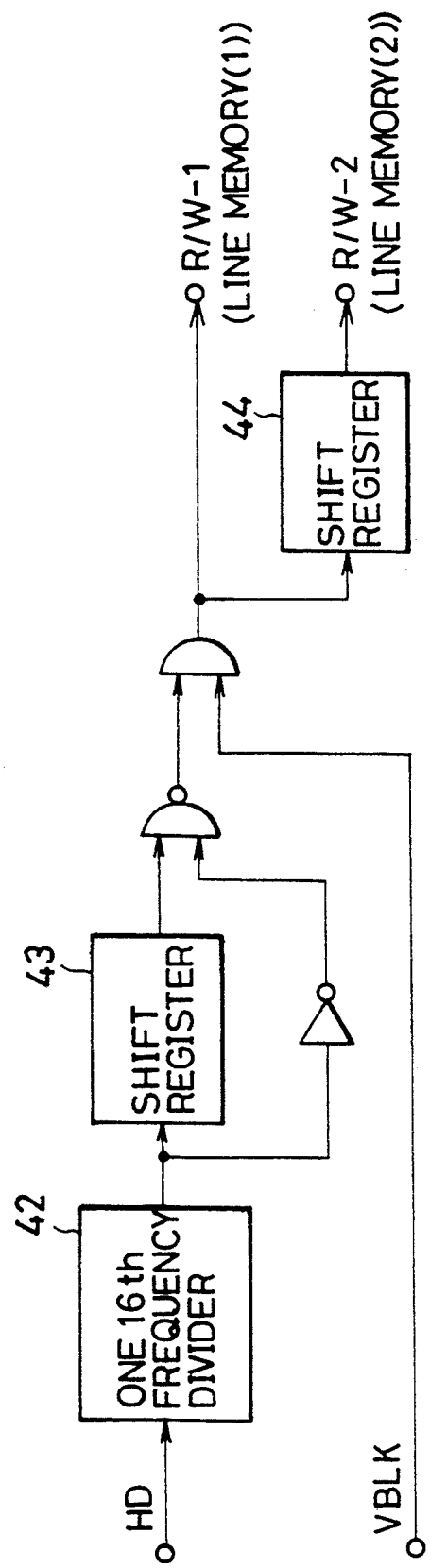
FIG. 8 shows a concrete example of a generating circuit for generating a 6H pulses switching the line memory from the reading operation to the writing operation or vice versa.

FIG. 8 shows a concrete example of a generating circuit for generating a 6H pulse switching the line memory from the reading operation to the writing operation or vice versa. This switching is conducted at 16H periods which is a sum of the durations of the write pulse (=10H) and the read pulse (=6H) as shown in FIG. 4. In FIG. 8, the horizontal synchronizing signal (HD) is divided by a one-16th frequency divider such that the frequency of output signals is 16th submultiple of the frequency of HD pulses. The one-16th divided HD pulse is delayed with the time period corresponding to 10 HD pulses by a shift register 43. Both the delayed pulse and the one 16th divided HD pulse through a NOT gate are input to a NAND gate, and an output pulse from the NAND gate and the VBLK signal are input to a AND gate. As a result, the AND gate outputs a write pulse with a high state of duration 10H and a low state of duration 6H. In addition, the write pulse is delayed with 8H periods by a shift register 44 to generate the a write pulse for the line memory (2).

Figure 9:
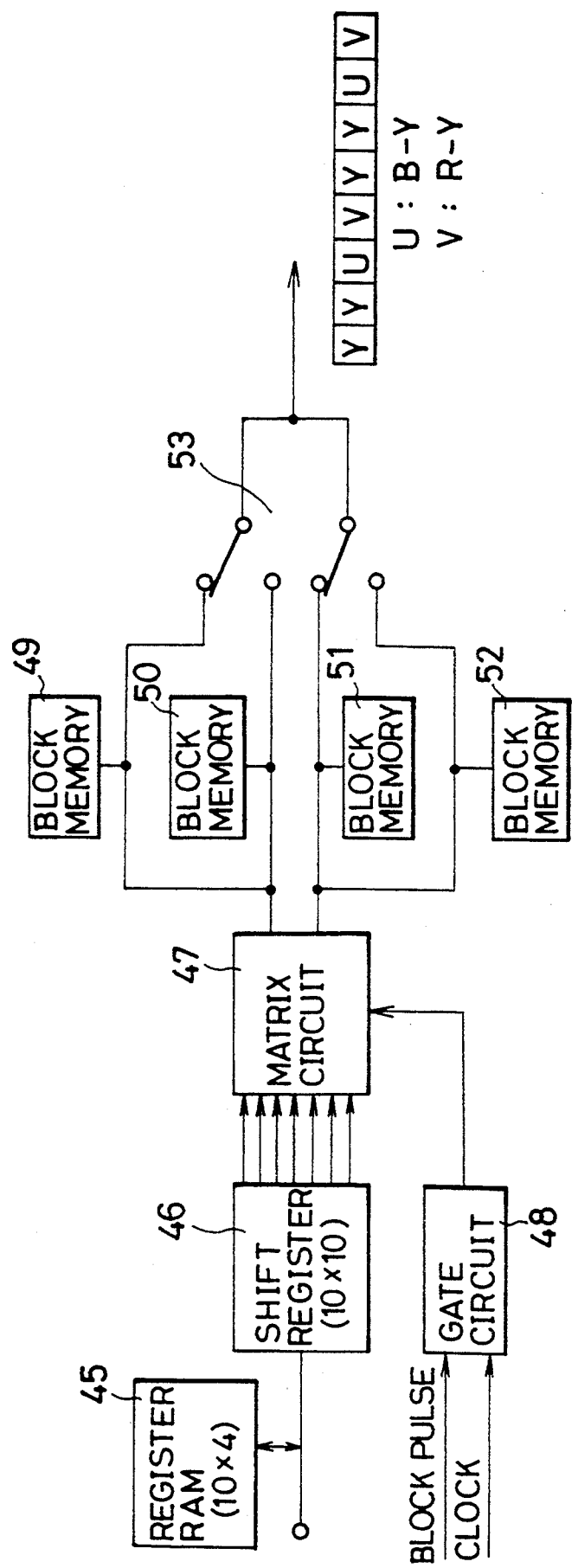
FIG. 9 shows an example of the signal processing circuit according to the first embodiment of the invention.

FIG. 9 shows an example of the signal processing circuit according to the first embodiment of the invention. In FIG. 9 reference numeral 45 denotes a register RAM capable of storing 10 (vertical)×4(horizontal) picture element data; 46, a shift register capable of storing 10(vertical)×10(horizontal) picture element data; 47, a matrix circuit; 48, a gate circuit; 49 to 52, block memories; and 53, a selecting switch. CDS block data in the form of 10(vertical)×10(horizontal) matrix read out of the line memory are input every block to the shift register 46, and simultaneously the 10×4 data, which are the left side part of the CDS block data, are stored temporally in the register RAM 45. The stored 10×4 CDS data are read out of the register RAM 45 before the next block data are read out, and then the next block data involving the next 10(vertical)×10(horizontal) CDS block data are input to the shift register 46. Simultaneously, the left side part of the next block data, or the 10×4 CDS block data are stored in the register RAM 45.

The shift register 46 selects 18 CDS data corresponding to 3(vertical)×6(horizontal) matrix from the stored block data and outputs them to the matrix circuit 47. The gate circuit 48 outputs a control signal to the matrix circuit 47 in response to clock signals (2CLK) for triggering the transfer of the CDS data from the line memory and block pulses generated every, when 8(vertical)×8(horizontal) data block is transferred. The matrix circuit 47 produces luminance signals and color-difference signals from the 18 CDS data in response to the control signal. The luminance and color-difference signals are stored temporally every block in the block memories 49 to 52. The switch 53 selects outputs of the block memories 49 to 52 and interleaves transfers of 8×8 block data from the block memories, whereby two blocks each involving a plurality of Y luminance signals and one B-Y color-difference signals block and one R-Y color-difference signals block are output in turn as shown in FIG. 9.

Figure 10:
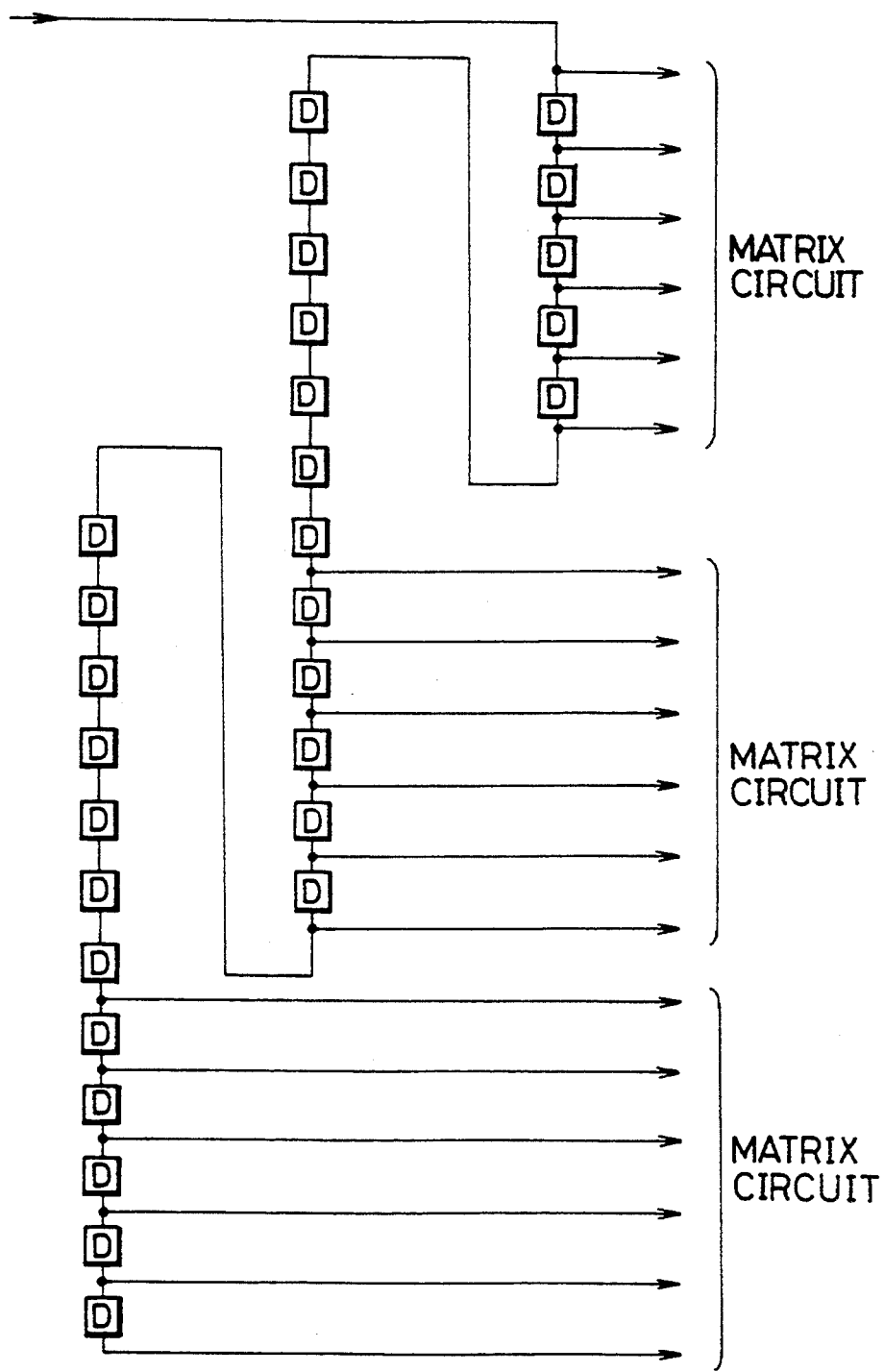
FIG. 10 shows a block diagram of shift registers outputting 18(=3×6) picture element data with 3 vertical lines and 6 horizontal elements simultaneously.

FIG. 10 shows a block diagram of shift registers outputting 18(=3×6) picture element data with 3 vertical lines and 6 horizontal elements simultaneously. 10×4 CDS data, which are the right side part of block image data in the register RAM 45, are read out and the next 10×8 CDS block data are read out from the line memory, and then these 10×12 CDS data are input to the shift registers (D) as shown in FIG. 10. 3(vertical)×6(horizontal) CDS data are selected from the 10×12 CDS data and input to the matrix circuit 47. The 10×12 CDS data are transferred one by one to the registers (D) such that the horizontal position of the transferred data in the matrix increases and the vertical position increases by '1' when all the 12 data in one line are read out. The registers (D) are arranged as shown in FIG. 10 and adapted to output 18 picture element data which are composed of a data matrix with 3 rows and 6 columns. The registers outputs a data of a remarkable picture element, 5 data of picture elements adjacent to the remarkable element in the horizontal direction, and the upper and lower side line data each involving 6 picture element data simultaneously. The remarkable picture element is located nearly in the center of the 6 picture elements on the center line.

Figure 11:
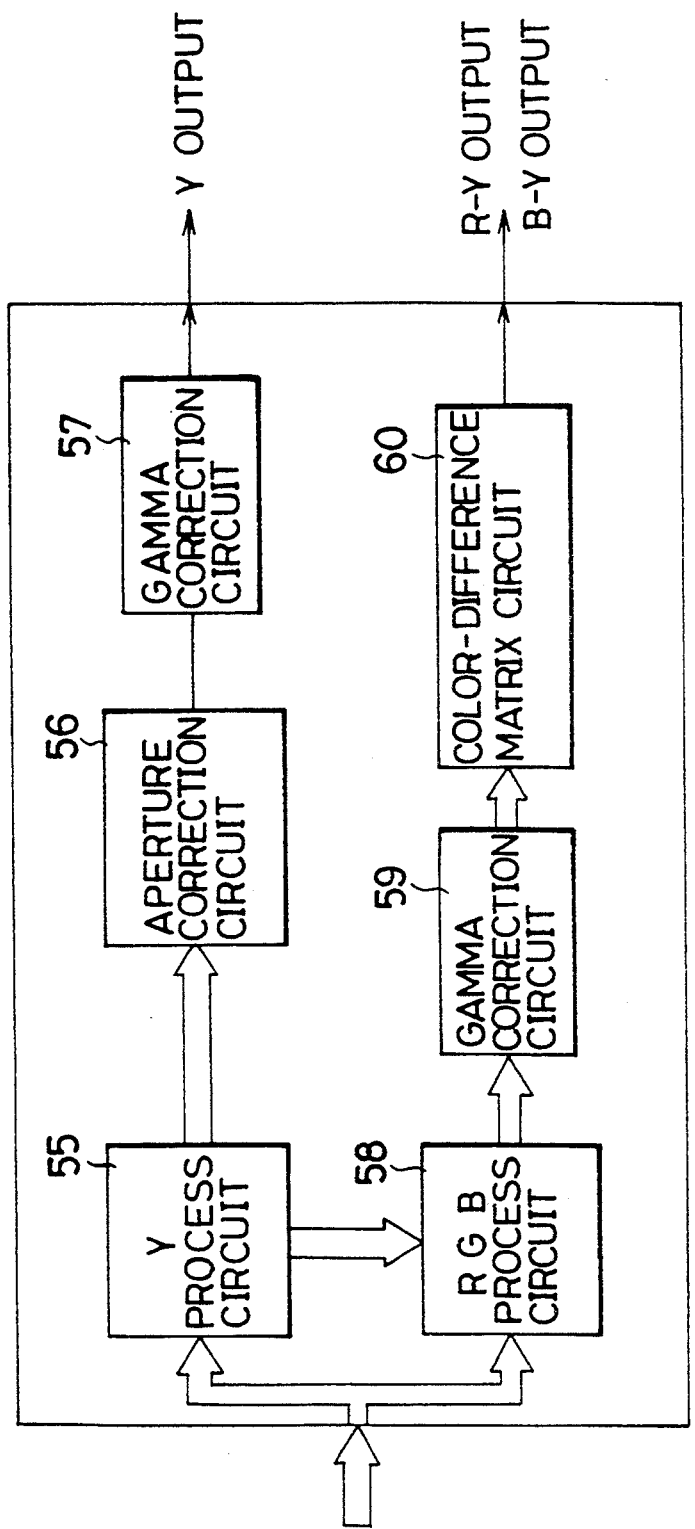
FIG. 11 shows a block diagram of the matrix circuit arranged in the embodiment shown in Fig. 9.

FIG. 11 shows a block diagram of the matrix circuit arranged in the embodiment shown in FIG. 9. In FIG. 11, reference numeral 55 denotes a Y process circuit; 56, an aperture correction circuit; 57, a gamma correction circuit; 58, RGB process circuit; 59, a gamma correction circuit; and 60, a color-difference matrix circuit. The CDS data for 18 picture elements output from the shift register 46 in FIG. 9 are input to the matrix circuit simultaneously. In FIG. 11, big arrows indicate that many data are transferred simultaneously.

The Y process circuit 55 for luminance signals converts CDS data into 15(=3×5) luminance signals with 3 vertical roars and 5 horizontal columns and supplies them to the aperture correction circuit 56. The luminance signals are put in aperture correction and the corrected signals are further put in gamma correction by the gamma correction circuit 57. On the other hand, the RGB process circuit 58 converts the CDS data from the shift register into first color-difference signals by means of a predetermined operation. Further, the RGB process circuit 58 receives luminance data from the Y process circuit 55 and performs a predetermined operation on the first color-difference data and the luminance data to obtain R signals, G signals and B signals. These three signals are put in gamma correction by the gamma correction circuit 59 and then input the color-difference matrix circuit 60, whereby second color-difference signals, that is R-Y and B-Y signals are obtained. The Y luminance signals and the second color-difference signals are output in block unit.

FIG. 12 shows a concrete example of the Y process circuit and the RGB process circuit in FIG. 11. The Y process circuit is provided with a plurality of adders. The adders are arranged so as to obtain the sums of any two adjacent data (D00 and D10, D10 and D20, ...) of 18 CDS data with 8 vertical lines and 6 horizontal columns (D00-D50, D01-D51, D02-D52). Thus, the Y process circuit derives the Y luminance block data involving 15 picture element data with 3 vertical lines and 5 horizontal columns (Y00-Y40, Y01-Y41, Y02-Y42) from the CDS data. The RGB process circuit is provided with a plurality of subtracters. The subtracters are arranged so as to obtain the differences between two adjacent data (D00 and D10, D20 and D30, ...) of 18 CDS data with 3 vertical lines and 6 horizontal columns (D00 DS0, D01 D51, D02 D52). Thus, the RGB process circuit derives color-difference block data (Cr00-Cr20, Cb01-Cb21, Cr02-Cr22) from the CDS data and performs the predetermined operation on them and the luminance data to obtain the three signals; the R signals, the G signals and the B signals.

FIG. 13 shows a writing and reading operation in the line memory according to the first embodiment of the invention.

In a case that a CCD having 400 thousands picture elements is applied to this embodiment, the clock frequency of the CCD is 14.3 MHz, the number of horizontal picture elements is 768, and the clock frequency of reading out from the line memory is 28.6 MHz, 10 line data are processed during a sequential process and the line data are divided into 96 blocks and the signal processing mentioned above are performed for every block in order to process the CDS data for every 8×8 block data.

When processing the 96 data blocks for every block, at least 10(vertical)×12(horizontal) data are necessary for the process. At first 10×10 data are read out of the line memory as the first data block, because the first block is located in the left side of the 10 line data, and thus the first data block and dummy data with 10 vertical lines and 2 horizontal columns are processed to derive the first 8×8 block data. Since the 10×4 block data, which are the right part of the prior processed block data, are stored in a register in the camera process circuit, only the next 10×8 CDS block data are read out from the successive processing after the first block. Therefore, the number of data, which are read out of the line memory for the processing of one data line block with 10 vertical lines and 768 horizontal columns, is 7,700 (=10×10+95×(8×10)). This reading operation for the blocks takes 7,700×35 nsec=269.5 sec. These data can be read every 6 line data as shown in FIG. 4.

As for such a video camera, it is necessary to put in aperture correction on CDS data from a CCD disposed in the video camera in order to correct the lowering of frequency characteristic (MTF) for the high-frequency components of a lens disposed directly before the CCD and to correct attenuation of the high-frequency components of a picture signal from the CCD caused by the finite cross-sectional area of one light-intercepting portion in the CCD, or caused by aperture distortion. The aperture correction circuit makes horizontal and vertical aperture corrections on the CDS data. In the horizontal aperture correction, the remarkable picture element's data is corrected at th basis of two data in the right and left side elements located adjacent to the remarkable element. In the vertical aperture correction, the remarkable picture element's data is corrected at the basis of two data in the upper and lower side elements located adjacent to the remarkable element.

FIG. 14 shows an example of the aperture correction. In the vertical aperture correction, the remarkable picture element's data is corrected at the basis of two data in the just upper and just lower side elements. In the horizontal aperture correction, the remarkable picture element's data is corrected at the basis of two data in the right and left side elements located over one element from the remarkable element. The general expression for the aperture correction is given by $$X' = X - \alpha\{(A+D)/2 - X\} - \beta\{(B+C)/2 - X\}$$

where
$\alpha\{(A+D)/2-X\}$: vertical aperture
$\beta\{(B+C)/2-X\}$: horizontal aperture
$\alpha, \beta$: coefficients of vertical and horizontal apertures respectively.

It is therefore necessary to pick up data blocks each having larger data size (for example 10×12 picture elements) than 8×8 data block for Discrete Cosine Transform (DCT) operation in order to process the remarkable 8×8 data block in the image processing every data block.

Figure 15:
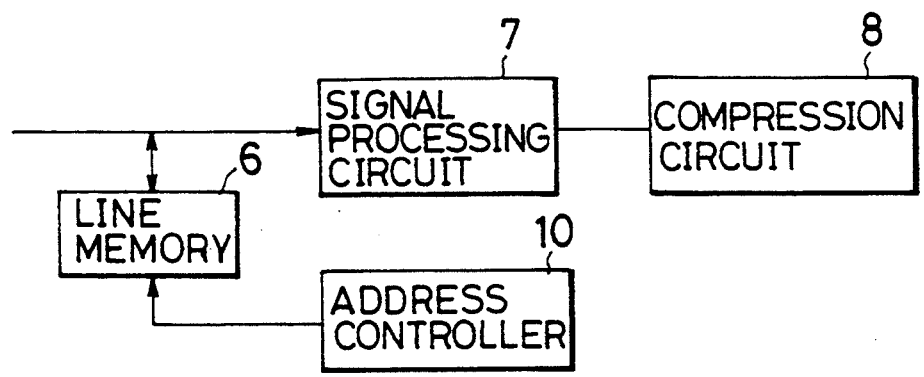
FIG. 15 shows a block diagram of a main part of a digital video camera according to a second embodiment of the invention.
Figure 16:
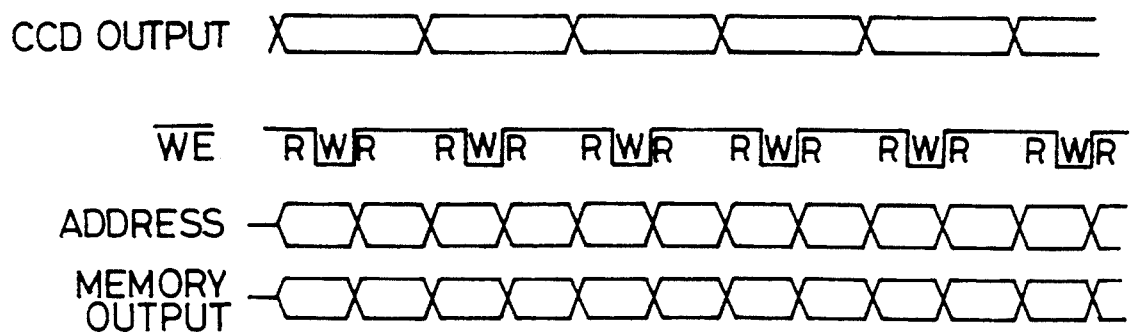
FIG. 16 shows a timing chart representing writing and reading processes in the line memory shown in FIG. 15.

FIG. 15 shows a block diagram of a main part of a digital video camera according to a second embodiment of the invention. FIG. 16 shows a timing chart representing writing and reading processes in the line memory shown in FIG. 15.

In FIG. 15, the line memory 6 is adapted to store 10 line data to perform Discrete Cosine Transform (DCT) operation on 8×8 block data. That is, the line memory 6 can store a set of 8 line data involving the 8×8 block data in question and the upper and lower line data. At first output signals corresponding to 10 raster scans are stores in the single port line memory 6. Block data are read out serially every block from the single port line memory 6 able to store 10 line data in response to clock signals having four times the frequency of write clock signals and are transferred block by block to the signal processing circuit 7. The luminance and color-difference signals are derived and output every block by the processing circuit 7. These signals are compressed by the compression circuit 8. The timing of these processing is controlled by the address controller 10.

Control signals for the writing and reading process of the line memory are generated from signals having four times the frequency of clock signals for the CCD.

The write pulse has a one-fourth duty in comparison with CCD output control signals as shown in FIG. 16. Output data from the CCD are read out in response to read pulses before and after the write pulse. The write address is equal to the read address corresponding to the read pulse before the write pulse. So called read modified write sequence is used. Therefore, the frequencies of address signals and memory output signals are equal to twice the frequency of clock signals for the CCD, that is, the frequencies of the address signals and memory output signals are 28.6 MHz and the frequency of the clock signals for the CCD is 14.3 MHz. The timing is not critical.

In a case that the frequency of read clock signals for the CCD is 7.15 MHz for steady image, a static random access memory with lower access speed can be used for the line memory.

Next, the description will be directed to a third embodiment of the invention. The detailed description for the basic construction are omitted because it is similar to the basic construction of the first embodiment in FIG. 1.

Figure 17:
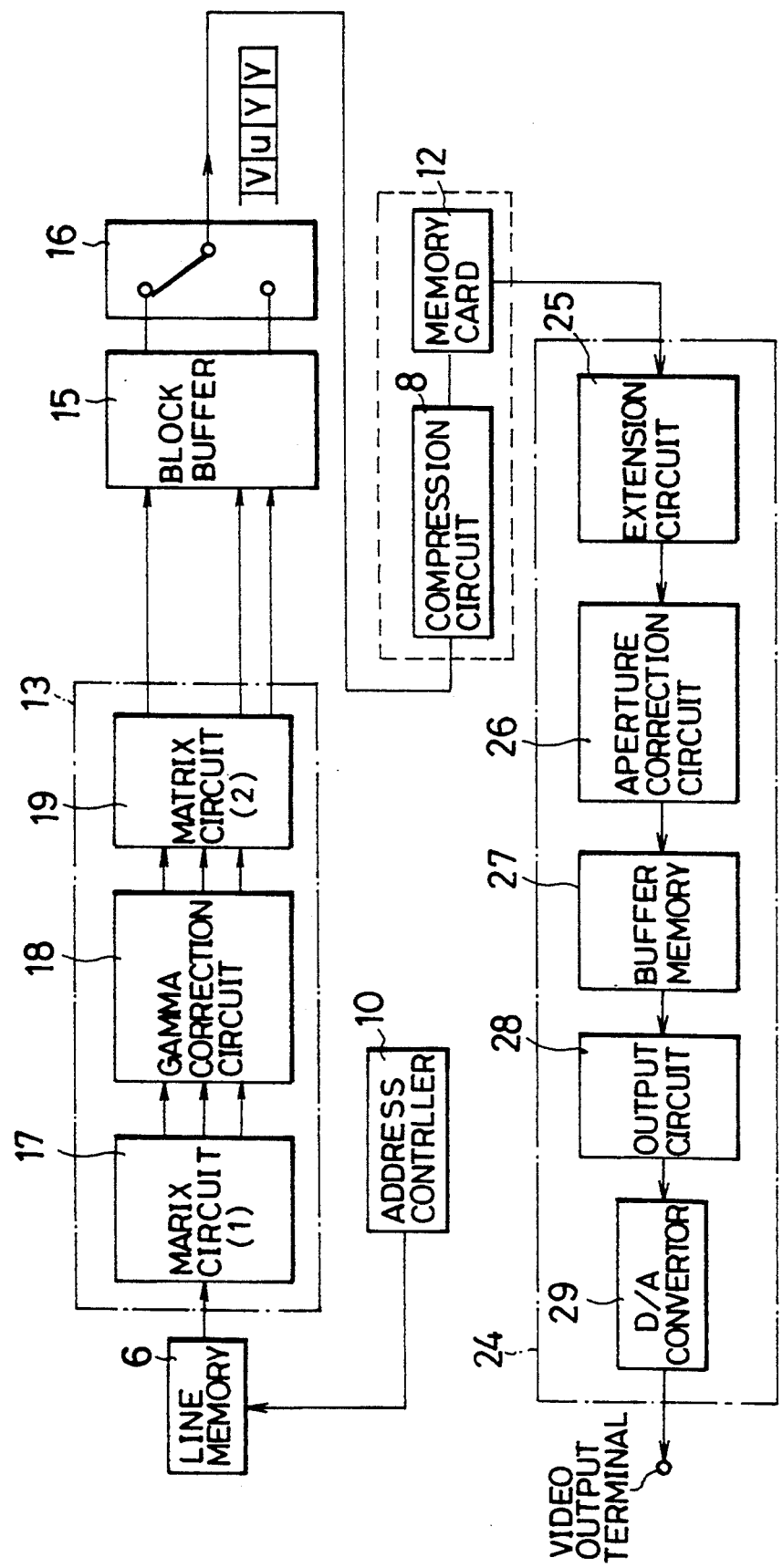
FIG. 17 shows a detailed block diagram of the signal processing circuit according to the third embodiment.

FIG. 17 shows a detailed block diagram of the signal processing circuit according to the third embodiment. In FIG. 17, reference numeral 13 denotes a camera process circuit; 15, a block buffer; 16, a switch for selecting one output of the block buffer; and 24, a reproduce circuit. The camera process circuit 13 comprises a matrix circuit (1) 17, a gamma correction circuit 18 and a matrix circuit (2) 19. The reproduce circuit 24 comprises an extend circuit 25, an aperture correction circuit 26, a buffer memory 27, an output circuit 28 and a digital to analog (D/A) convertor 29.

Digital output signals in one block, which results from the conversion from raster signals in the line memory 6 capable of storing n line raster signals under the control of the address controller 10, are transferred to the camera process circuit 13, whereby the digital signals are converted into luminance signals and color-difference signals in one block by the matrix circuit (1) 17 and these signals are corrected by the gamma correction circuit 18 in accordance with gamma of a cathode-ray tube. Further, the corrected signals are converted into luminance signals (Y) and color-difference signals (R-Y and B-Y) by the matrix circuit (2) 19, and the luminance signals (Y) are stored in the block buffer 15 after the correction with respect to frequency characteristics by the aperture control circuit 14 and the color-difference signals (R-y and B-Y) are also stored in the buffer 15. The block buffer 15 can store one block for luminance signals (Y) and two blocks for color-difference signals (R-Y and B-Y). The changing switch 16 interleaves transfers of the luminance signals (Y) and the color-difference signals (R-Y and B-Y) from the buffer 15 to the compression circuit, whereby the Y block of the luminance signals (Y), the R-Y block of the color-difference signals (R-Y) and the B-Y block of the color-difference signals (B-Y) are transferred serially to the compression circuit 8 and stored in the memory card 12.

When the compressed image data stored in the memory card 12 are reproduced, the compressed image data are extended by the extension circuit 25 in the reproduce circuit 24 and put in aperture correction for the camera by the aperture correction circuit 26. The reproduced image data are stored in the buffer memory 27 with a memory capacity of one image plane. When the buffer memory 27 is full, the stored data are converted into the reproducing video signals by the output circuit 28 and further the video digital signals are converted into the reproducing video analog signals by the D/A convertor 29, then the analog video signals are output by the video output terminal.

Figure 18:
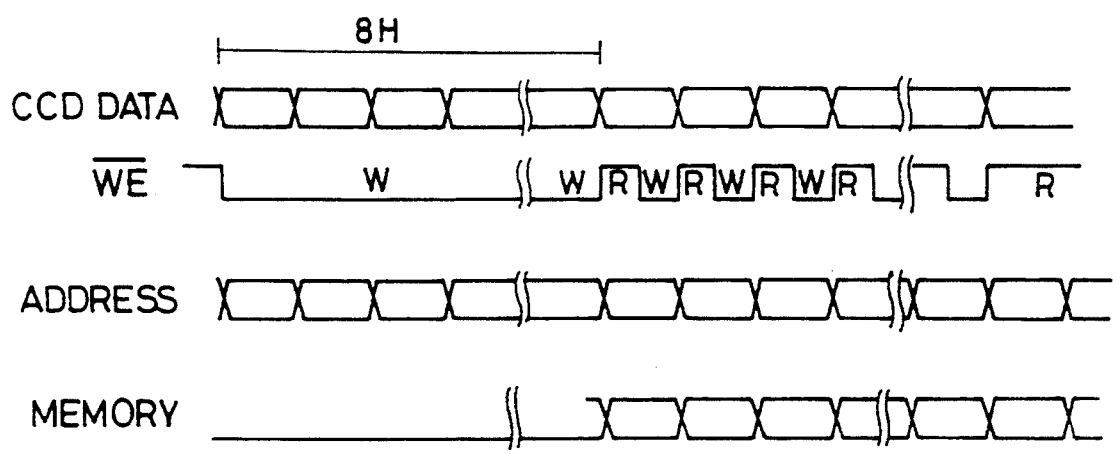
FIG. 18 shows a timing chart of writing and reading control signals for the line memory according to the third embodiment of the invention.

FIG. 18 shows a timing chart of writing and reading control signals for the line memory according to the third embodiment of the invention. In FIG. 18, CCD output data corresponding to 8 lines are stored in response to CCD clock signals. The reading and writing processes are performed alternately at twice the frequency of the CCD clock signals. The data read out in the reading process are written in the locations of the line memory having the same addresses, respectively.

These addresses are produced in accordance with the order of data block to be processed. Thus, the camera process circuit can convert CCD block data obtained by raster scans into 8×8 block data every block by means of the Discrete Cosine Transform (DCT) or the like using the single line memory.

When the last 8 line data are read out of the line memory, no CCD data are input to the memory and only the last data blocks corresponding to the last 8 line data are read out and output, then the sequential process is ended.

Figure 19A:
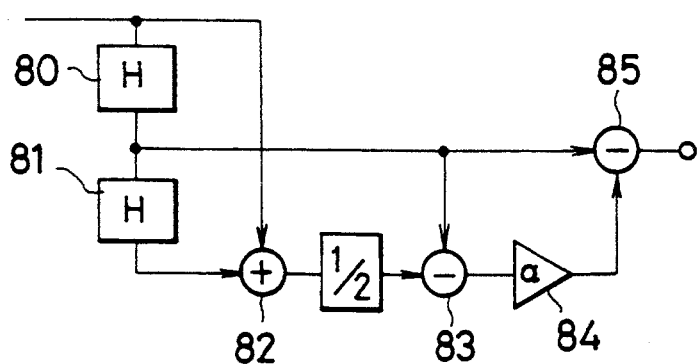
FIG. 19a, 19b show an example of the aperture correction circuit for the reproducing process according to the third embodiment of the invention.
Figure 19B:
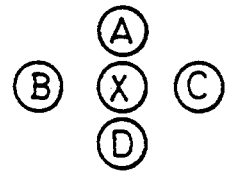

FIG. 19 shows an example of the aperture correction circuit for the reproducing process according to the third embodiment of the invention. In FIG. 19, reference numerals 80 and 81 denote a horizontal delay line; 82, an adder; 83 and 85, a subtracter; and 84, a multiplier. It is necessary as for a video camera to put in aperture correction on CDS data from the CCD to correct the lowering of frequency characteristic (MTF) for the high-frequency components of a lens disposed directly before the CCD and to correct attenuation of the high-frequency components of a picture signal from the CCD caused by the finite cross-sectional area of one light-intercepting portion in the CCD, or caused by aperture distortion. The aperture correction circuit makes horizontal and vertical aperture corrections on the CDS data. In the horizontal aperture correction, the remarkable picture element's data is corrected at the basis of two data in the right and left side elements located adjacent to the remarkable element. In the vertical aperture correction, the remarkable picture element's data is corrected at the basis of two data in the upper and lower side elements located adjacent to the remarkable element. The general equation in the aperture correction is similar to the aperture correction of the first embodiment and given by the expression (1) (see FIG. 19b).

The adder 82 receives directly the reproducing luminance signal (D) which is after the reproducing luminance signal (X) of the remarkable element by one horizontal period, together with the delayed another reproducing luminance signal (A) through the horizontal delay lines 80 and 81, simultaneously as shown in FIG. 19a. The delayed signal (A) is delayed with two horizontal periods from the original signal. The luminance signal (X) is delayed by the horizontal delay line 80 and input to the subtracters 83 and 85. The output signal by the adder 82 is divided by 2 and the result is input to the subtracter 83. Thus, the divided result is subtracted by the luminance signal (X) to obtain the aperture component. The aperture component is multiplied with the correction coefficient α by the multiplier 84 to adjust amount of the aperture correction. Then, the aperture component multiplied by α is subtracted from the reproducing luminance signal (X) by the subtracter 85, whereby the vertical aperture correction is conducted. The similar processing circuit is applied for the horizontal correction.

Figure 20A:
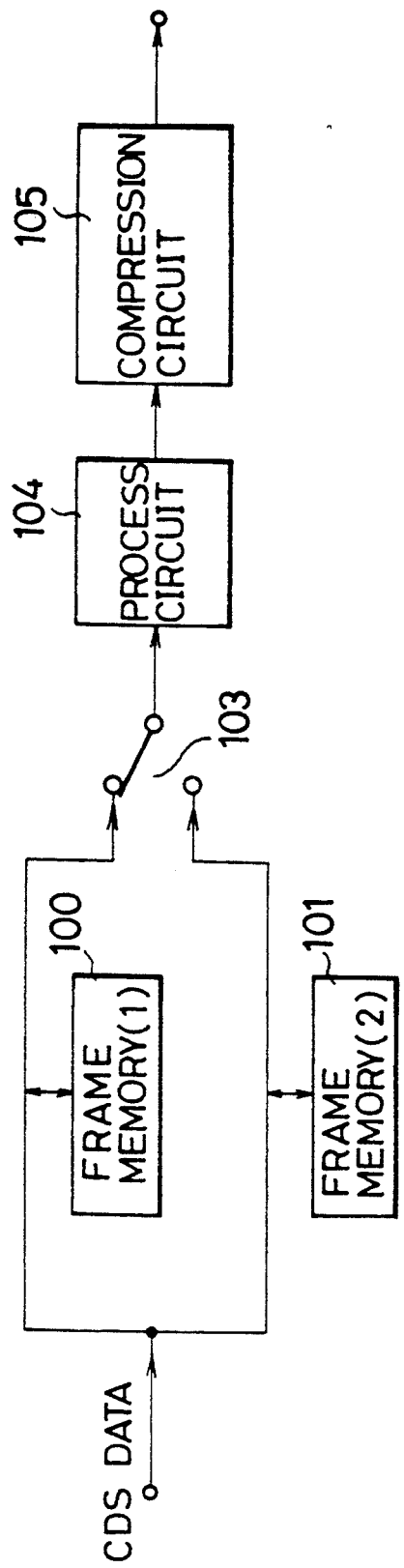
FIG. 20a, 20b show an example of a main part of the digital video camera processing motion pictures and having two frame memories capable of storing CDS data in one frame as a substitute of the line memory.

It is possible technically to realize a digital video camera processing a motion picture without the line memory. FIG. 20 shows an example of a main part of the digital video camera processing a motion pictures and having two frame memories each capable of storing CDS data in one frame as a substitute of the line memory. These memories are used alternately. In FIG. 20a, reference numeral 100 denotes a frame memory (1); 101, a frame memory (2); 103, a changing switch; 104, a process circuit; and 105, a compression circuit.

Figure 20B:
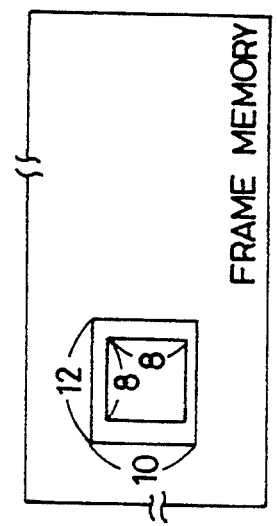

Addresses are generated and applied to the frame memory (1) 100 and the frame memory (2) 101 alternately and every frame in the reading or writing process. That is, at first CDS data in one frame are stored in the frame memory (1) 100 and the next time CDS data of the next frame are stored in the frame memory (2) 101, and simultaneously CDS data are read out from the frame memory (1) every 10×12 block as shown in FIG. 20b. The digital video camera does not need any register RAM as shown in FIG. 9 because CDS data can be read out every 10×12 block. CDS data can be processed in real time by the camera process circuit, or the process circuit using alternately the frame memory (1) 100 and the frame memory (2) 101 in the reading and writing process.

Figure 21:
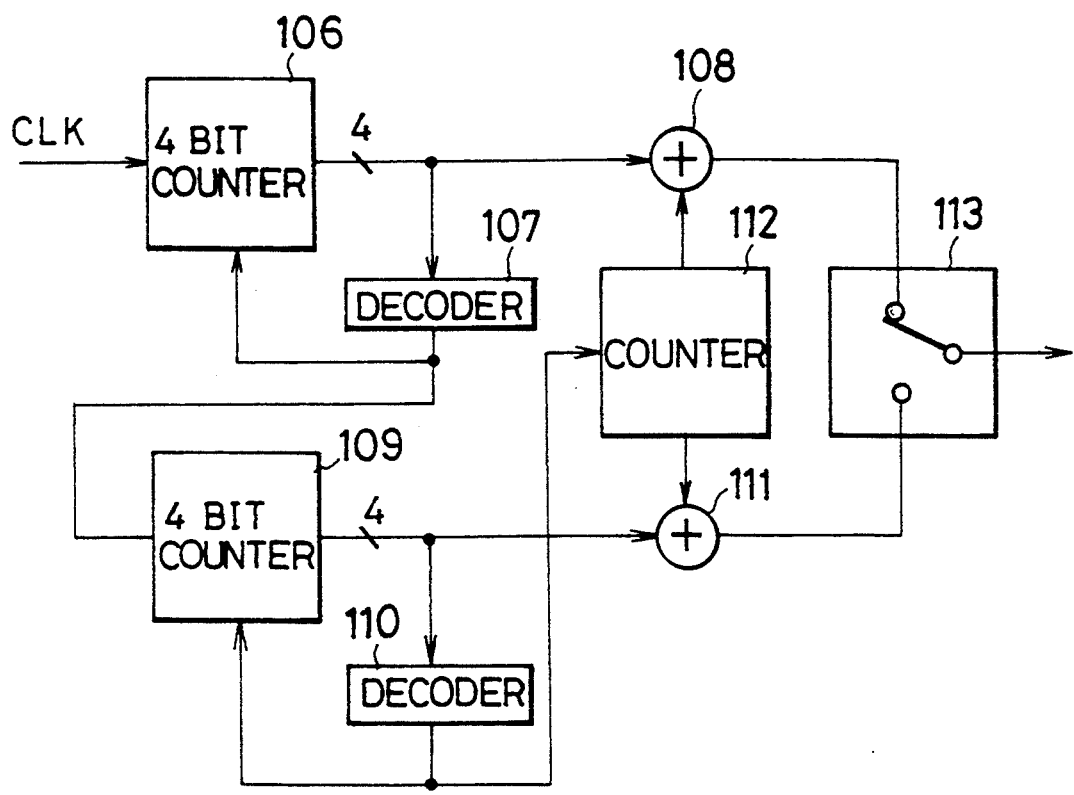
FIG. 21 shows an example of the address circuit for the reading of the frame memory in FIG. 20.

FIG. 21 shows an example of the address circuit for the reading of the frame memory in FIG. 20. In FIG. 21, reference numeral 106 and 109 denote a 4 bit counter; 107 and 110, a decoder; 108 and 111, an adder; 112, a counter; and 113, a changing switch. When writing CDS data in the frame memory, addresses are generated in accordance with the order of raster scans. On the other hand, addresses must be generated every block as shown in FIG. 20b when reading out CDS data. The clock signals (CLK) for the transfer of CDS data are counted by the 4 bit counter 106 as well as the address controller in FIG. 6. The 4 bit counter 106 outputs a horizontal address signal. When the horizontal signal represents the decimal number 12, the decoder 107 decodes the signal and outputs a reset signal to the 4 bit counter 106, whereby the 4 bit counter 106 is reset. The reset signal is also input to the 4 bit counter 109 as a clock pulse for vertical direction of 10×12 block data to read out CDS data every block. The 4 bit counter 109 outputs a vertical address signal. When the vertical address signal represents the decimal number 10, the decoder 110 decodes the signal and outputs a reset signal to the 4 bit counter 109, whereby the 4 bit counter 109 is reset. The reset signal by the decoder 110 is also input to the counter 112 as a block clock pulse representing that all CDS data in one block are transferred.

The horizontal address and the output signal from the counter 112 are summed cumulatively by the adder 108 to produce a horizontal column address of the reading address. The vertical address and the output signal from the counter 112 are summed cumulatively by the adder 111 to produce a vertical row address of the reading address. These addresses are multiplexed by the changing switch 113 and output as an address of the frame memory.

Many widely embodiments of the present invention may be constructed without departing from the spirit and the scope of the present invention is not limited to the specific embodiments described in the specification, except as defined in the appended claims.

What is claimed is:

1. A digital video camera including an image sensor, comprising:
line memory means for storing a plurality of digitized raster scanning data transferred from the image sensor; and
processing means for reading out a plurality of data in the form of block or matrix from said line memory means and converting the data into luminance data every block or matrix, and wherein said line memory means comprises two line memories each storing a plurality of digitized raster scanning data and a switch circuit connected to said two line memories for connecting said two line memories with said processing means alternately, and wherein said processing means includes a camera process circuit receiving block data with N rows and M columns and converting the block data into luminance block data with L rows and L columns, and an aperture correction circuit connected to said camera process circuit for putting in aperture correction on the luminance block data.

2. A digital video camera according to claim 1, wherein said processing means further includes a shift register connected to said line memories for storing block data with N rows and M1 columns where M1 is smaller than M, and a RAM register connected to said line memories and said shift register for storing block data with N rows and M2 columns where M2 is smaller than M1.

3. A digital video camera according to claim 2, wherein said processing means further includes block buffer means connected to said camera process circuit for storing the luminance block data every block, and a multiplexer connected to said processing means for interleaving transfers of the luminance block data from said block buffer means to an output of said processing means.

4. A digital video camera including an image sensor, comprising:
line memory means for storing a plurality of digitized raster scanning data transferred from the image sensor; and
processing means for reading out a plurality of data in the form of block or matrix from said line memory means and converting the data into luminance data every block or matrix, and wherein said line memory means comprises a single line memory, and wherein said processing means includes a camera process circuit receiving block data with N rows and M columns and converting the block data into luminance block data with L rows and L columns, and an aperture correction circuit connected to said camera process circuit for putting an aperture correction on the luminance block data.

5. A digital video camera according to claim 4, wherein said processing means further includes block buffer means connected to said camera process circuit for storing the luminance block data every block, and a multiplexer connected to said processing means for interleaving transfers of the luminance block data from said block buffer means to an output of said processing means.

6. A digital video camera including an image sensor, comprising:
line memory means for storing a plurality of digitized raster scanning data transferred from the image sensor;
processing means for reading out a plurality of data in the form of block or matrix from said line memory means and converting the data into luminance data every block or matrix; and
controlling means for controlling a timing of a storing process of the plurality of digitized raster scanning data in said line memory means and a reading out process of the plurality of data by said processing means, and wherein said line memory means comprises two line memories each storing a plurality of digitized raster scanning data and a switch circuit connected to said two line memories for connecting said two line memories for connecting said two line memories with said processing means alternately, and wherein said processing means includes a camera process circuit receiving block data with N rows and m columns and converting the block data into luminance block data with L rows and L columns, and an aperture correction circuit connected to said camera process circuit for putting in aperture correction on the luminance block data.

7. A digital video camera according to claim 6, wherein said controlling means comprises an address controller controlling the reading out process from said line memories by said processing means at twice a frequency of write clock signals in the storing process.

8. A digital video camera according to claim 6, wherein said processing means further include a shift register connected to said line memories for storing block data with N rows and M1 columns where M1 is smaller than M, and a RAM register connected to said line memories and said shift register for storing block data with N rows and M2 columns where M2 is smaller than M1.

9. A digital video camera according to claim 8, wherein said processing means further includes block buffer means connected to said camera process circuit for storing the luminance block data every block, and a multiplexer connected to said processing means for interleaving transfers of the luminance block data from said block buffer means to an output of said processing means.

10. A digital video camera including an image sensor, comprising:
line memory means for storing a plurality of digitized raster scanning data transferred from the image sensor;
processing means for reading out a plurality of data in the form of block or matrix from said line memory means and converting the data into luminance data every block or matrix; and
controlling means for controlling a timing of a storing process of the plurality of digitized raster scanning data in said line memory means and a reading out process of the plurality of data by said processing means, and wherein said line memory means comprises a single line memory, and wherein said processing means includes a camera process circuit receiving block data with N rows and M columns and converting the block data into luminance block data with L rows and L columns, and an aperture correction circuit connected to said camera process circuit for putting in aperture correction on the luminance block data.

11. A digital video camera according to claim 10, wherein said controlling means comprises an address controller controlling the reading out process from said line memories by said processing means at twice a frequency of write clock signals in the storing process.

12. A digital video camera according to claim 11, wherein said processing means further includes block buffer means connected to said camera process circuit for storing the luminance block data every block, and a multiplexer connected to said processing means for interleaving transfers of the luminance block data from said block buffer means to an output of said processing means.

13. A digital video camera including an image sensor, comprising:

a single line memory for storing a plurality of digitized raster scanning data transferred from the image sensor;

processing means for reading out a plurality of data in the form of block or matrix from said line memory and converting the data into luminance data every block or matrix;

controlling means for controlling a timing of a storing process of the plurality of digitized raster scanning data in said line memory and a reading out process of the plurality of data by said processing means;

compressing means for compressing the luminance data transferred from said processing means;

recording means for recording said compressed luminance block data; and reproducing means for reading out said recorded luminance block data from said recording means and reproducing video analog signals from these data.

14. A digital video camera according to claim 13, wherein said reproducing means comprises an aperture correction circuit for putting in aperture correction on said recorded luminance block data.

* * * * *